United States Patent [19]

Lee, Jr.

[11] 4,298,514

[45] Nov. 3, 1981

[54] FLAME RETARDANT THERMOPLASTIC POLYPHENYLENE ETHER RESIN COMPOSITIONS

[75] Inventor: Gim F. Lee, Jr., Albany, N.Y.

[73] Assignee: General Electric Company, Pittsfield, Mass.

[21] Appl. No.: 87,163

[22] Filed: Oct. 22, 1979

Related U.S. Application Data

[62] Division of Ser. No. 671,342, Mar. 29, 1976, Pat. No. 4,203,931.

[51] Int. Cl.$^3$ .......................... C08K 5/10; C08K 5/54; C08L 83/12
[52] U.S. Cl. ...................... 260/29.1 SB; 260/30.4 R; 260/30.8 R; 260/31.8 R; 260/31.8 B
[58] Field of Search .................. 260/31.8 B, 29.1 SB, 260/30.4 R, 30.8 R, 31.8 R

[56] References Cited

U.S. PATENT DOCUMENTS

| | | | |
|---|---|---|---|
| 3,721,639 | 3/1973 | Gattus et al. | 260/30.4 R |
| 3,809,729 | 5/1974 | Reinhard | 260/45.7 P |
| 3,956,220 | 5/1978 | Riem et al. | 260/31.8 B |
| 4,098,753 | 7/1978 | Tsiglinos et al. | 260/31.8 B |

FOREIGN PATENT DOCUMENTS

| | | | |
|---|---|---|---|
| 2506667 | 11/1975 | Fed. Rep. of Germany | 260/29.1 SB |
| 2752383 | 6/1978 | Fed. Rep. of Germany | 260/31.8 T |
| 691628 | 5/1953 | United Kingdom | 260/29.1 SB |

*Primary Examiner*—Joseph L. Schofer
*Assistant Examiner*—Peter F. Kulkosky
*Attorney, Agent, or Firm*—Morgan, Finnegan, Pine, Foley & Lee

[57] ABSTRACT

Self-extinguishing and non-dripping thermoplastic compositions are provided which comprise a polyphenylene ether resin, a styrene resin, a halogenated aromatic flame retardant compound, an antimony containing compound, and an additive selected from the group consisting of polyesters, polyethylene, a low molecular weight polystyrene resin, alkyl esters of trimellitic acid, epoxy stearates, epoxy tetrahydrophthalates, a diorganopolysiloxane fluid, alkyl esters of adipic acid, alkyl esters of glycolic acid, dialkyl phthalates and triaryl phosphates.

17 Claims, No Drawings

FLAME RETARDANT THERMOPLASTIC POLYPHENYLENE ETHER RESIN COMPOSITIONS

CROSS-REFERENCE TO RELATED APPLICATION

This application is a division of application Ser. No. 671,342, filed Mar. 29, 1976, which matured into U.S. Pat. No. 4,203,931 on May 20, 1980.

This invention relates to flame retardant thermoplastic compositions of a polyphenylene ether resin. More particularly, self-extinguishing, non-dripping molding compositions are disclosed which comprise a polyphenylene ether resin, a styrene resin, a halogenated aromatic flame retardant, an antimony containing compound and, to facilitate processing and to obtain improved mechanical properties in the finished molded articles, an additive selected from the group consisting of polyesters, polyethylene, a low molecular weight polystyrene resin, alkyl esters of trimellitic acid, epoxy stearates, epoxy tetrahydrophthalates, diorganopolysiloxane fluids, alkyl esters of adipic acid, alkyl esters of glycolic acid, dialkyl phthalates and triaryl phosphates.

BACKGROUND OF THE INVENTION

Polyphenylene ether resins are known in the art as a class of thermoplastics which are characterized by excellent physical properties, including hydrolytic stability, dimensional stability and excellent dielectric properties. In general, they are prepared by the oxidative coupling of a phenolic compound with complex metal catalysts, e.g., a complex copper catalyst. The preparation of polyphenylene ether resins is described in Hay, U.S. Pat. Nos. 3,306,874 and 3,306,875, which is incorporated herein by reference.

It is known that when polyphenylene ether resins are combined with styrene resins, e.g., rubber-modified high-impact polystyrene, the resulting compositions provide properties which are superior to those of each of these resins alone. Such combinations are disclosed in Cizek, U.S. Pat. No. 3,383,435, the disclosure of which is incorporated herein by reference. However, the addition of styrene resins to the normally self-extinguishing and non-dripping polyphenylene ether resin results in molding compositions and articles which are normally flammable, i.e., unable to meet minimum requirements established by various testing groups such as Underwriters' Laboratories. Moreover, these compositions drip flaming resin while burning.

Self-extinguishing, i.e., flame retardant, thermoplastic compositions of a polyphenylene ether resin and a styrene resin are known. It has been proposed, for example, to render polyphenylene ether-polystyrene combinations flame retardant with the addition of combinations of aromatic halogen compounds, e.g., chlorinated biphenyls, and aromatic phosphates. Such compositions are disclosed in Haaf, U.S. Pat. No. 3,639,506, which is incorporated herein by reference.

More recently, it has been proposed that normally flammable polyphenylene ether-polystyrene combinations can be rendered self-extinguishing and non-dripping with a flame retardant combination of an aromatic halogen compound, e.g., hexambromobenzene, and an antimony containing compound, e.g., antimony oxide. Such compositions are disclosed in Reinhard, U.S. Pat. No. 3,809,729, incorporated herein by reference.

These flame retardant prior art compositions, particularly those which employ antimony oxide, are not entirely satisfactory, however. In such compositions the flame retarding agent decomposes at elevated temperatures. Moreover, articles molded from such compositions are somewhat brittle, apparently because of the presence of the flame retarding agent. Although it has been found that by lowering the processing temperatures of the molding compositions decomposition of the flame retarding agent is minimized, embrittlement still occurs.

It has now been surprisingly discovered that certain materials can be added to flame retardant polyphenylene ether-polystyrene compositions which promote the retention of mechanical properties, without adversely affecting flame resistance properties. More particularly, it has been found that when the additives of this invention are added to polyphenylene ether-polystyrene compositions containing a flame retardant combination of a halogenated aromatic compound and an antimony compound, compositions are obtained which have good flame resistance properties and unexpectedly improved mechanical properties, including improved impact strength.

DESCRIPTION OF THE INVENTION

By the present invention, in its broadest aspects, there are provided flame retardant, self-extinguishing and non-dripping thermoplastic compositions for molding, e.g., injection molding, compression molding, transfer molding and extrusion, said compositions comprising:
(i) a polyphenylene ether resin;
(ii) a styrene resin;
(iii) a halogenated aromatic flame retardant compound;
(iv) an antimony containing compound; and
(v) an additive selected from the group consisting of polyesters, polyethylene, a low molecular weight polystyrene resin, alkyl esters of trimellitic acid, epoxy stearates, epoxy tetrahydrophthalates, diorganopolysiloxane fluids, alkyl esters of adipic acid, alkyl esters of glycolic acid, dialkyl phthalates and triaryl phosphates.

As employed herein, the term "normally flammable" refers to a composition which does not meet either the requirements of ASTM test method D-635 or the more stringent requirements of Underwriters' Laboratories Bulletin No. 94 test (UL Standard 94 vertical burning test).

It is preferred that the polyphenylene ether resin (i) be one of the family represented by the formula:

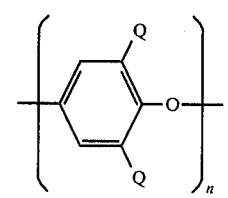

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

The preparation of polyphenylene ether resins corresponding to the above formula is described in Hay, U.S. Pat. Nos. 3,306,874 and 3,306,875 and in Stamatoff, U.S. Pat. Nos. 3,257,357 and 3,257,358, which are incorporated herein by reference.

Especially preferred polyphenylene ether resins for purposes of the present invention are those having alkyl substitution in the two positions ortho to the oxygen ether atom, i.e., where each Q is alkyl, most preferably, having from 1 to 4 carbon atoms. The most preferred polyphenylene ether resin is poly(2,6-dimethyl-1,4-phenylene) ether—each Q is methyl. Preferably, this polymer should have an intrinsic viscosity of about 0.5 deciliters per gram as measured in chloroform at 25° C.

The preferred styrene resins (ii) will be those having at least 25% by weight of repeating units derived from a vinyl aromatic compound of the formula:

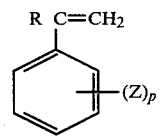

wherein R is hydrogen, (lower) alkyl or halogen; Z is vinyl, halogen or (lower) alkyl; and p is 0 or an integer of from 1 to the number of replaceable hydrogen atoms on the benzene nucleus. Herein, the term "(lower) alkyl" means alkyl of from 1 to 6 carbon atoms.

The term "styrene resins" is used broadly to define components fully described in the above-mentioned Cizek patent. Merely by way of illustration, such resins will be homopolymers, such as polystyrene, polychlorostyrene and polyvinyl toluene, the modified polystyrenes such as rubber modified polystyrene blended or grafted high impact products, e.g., the rubber being a polybutadiene or a rubbery copolymer of from about 2 to about 30% styrene and from about 98 to about 70% of a diene monomer. Also included are styrene containing copolymers, such as styrene-acrylonitrile copolymers, styrene-butadiene copolymers, styrene-acrylonitrile-butadiene terpolymers, poly-alphamethylstyrene, copolymers of ethyl vinyl benzene and divinyl benzene, styrene-maleic anhydride copolymers, and the like.

Especially preferred styrene resins are those wherein R is hydrogen and p is 0. These include homopolystyrene and rubber-modified polystyrene, e.g., one which contains a polybutadiene or rubbery styrene butadiene copolymer, and the like. The preferred normally flammable compositions are described in great detail in Cizek, U.S. Pat. No. 3,383,435.

The preferred halogenated aromatic flame retardant compounds (iii) are those which are described in the above-referenced Haaf, U.S. Pat. No. 3,639,506. Preferred halogen compounds for this invention are chlorinated benzene, brominated benzene, chlorinated biphenyl, brominated biphenyl, chlorinated terphenyl, brominated terphenyl, a compound comprising two phenyl radicals separated by a divalent alkylene or oxygen group and having at least two chlorine or bromine atoms per phenyl radical, monochloropolystyrene, bromine containing aromatic polycarbonates, chlorine containing aromatic polycarbonates and mixtures thereof.

Examples include tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms, e.g., decabromodiphenyl oxide. Especially preferred is decabromodiphenyl oxide.

Antimony compounds (iv) useful in this invention are widely available or can be made in known ways. The type of antimony compound used is not critical, being a choice primarily based on economics. Both inorganic and organic antimony compounds can be used. For example, as inorganic compounds, there can be used: antimony oxide, $Sb_4O_6$; antimony chloride, $SbCl_3$; antimony phosphate; $KSb(OH)_6$; $NH_4SbF_6$; $SbS_3$; and the like. A wide variety of organic antimony compounds can also be used, such as antimony esters with organic esters, cyclic alkyl antimonites, aryl antimonic acids, and the like. Illustrative of the organic antimony compounds, including inorganic salts of such compounds are: KSb tartrate; Sb caproate; $Sb(OCH_2CH_3)_3$; $Sb(OCH(CH_3)CH_2CH_3)_3$; Sb polymethylene glycolate; triphenyl antimony; and the like. Especially preferred as the antimony containing compound is antimony oxide.

The polyesters of (v) generally include unsaturated polyesters which are the esterification condensation products of an unsaturated dibasic acid and a glycol. These polyesters can include saturated acids, e.g., isophthalic acid, adipic acid, phthalic anhydride, and the like, which are typically used to control the degree of unsaturation and activity in the polyester resin. The polyesters can also be thermoplastic polyesters, such condensation products of glycols and aromatic polybasic acids, e.g., polybutylene terephthalate, polyethylene terephthalate, and the like.

Examples are Paraplex G 25, Paraplex G 30 and Paraplex G 41, commercially available from Rohm and Haas Co.; Plastolein 9765 and Plastolein 9789 available from Emery Industries, Inc.; Santicizer 409 and Santicizer 411, Monsanto Chemical Co.; and Valox 310, a high molecular weight crystalline polyester, available from General Electric Co.

The alkyl esters of trimellitic acid of (v) include those esters having straight and branched chain alkyl groups of 1-10 carbon atoms. Examples of these esters include tri-2-ethylhexyl trimellitate, n-octyl trimellitate, n-decyl trimellitate and triisodecyl trimellitate, A preferred alkyl ester of trimellitic acid is Santicizer 79 TM, commercially available from Monsanto Co.

The epoxy stearates of (v) include epoxy butyl stearate, epoxy n-hexyl stearate, epoxy isooctyl stearate and other epoxidized alkyl stearates wherein the alkyl group is a straight or branched chain hydrocarbon group having from 1 to 10 carbon atoms. The epoxy tetrahydrophthalates include the epoxidized alkyl tetrahydrophthalates wherein the alkyl group is a straight or branched chain hydrocarbon group having from 1 to 10 carbon atoms such as epoxy 2-ethylhexyl tetrahydrophthalates and epoxy isodecyl tetrahydrophthalates.

The diorganopolysiloxane fluids are polymeric silicone fluids having a viscosity of from about 50 to about 1,000 cps. at 25° C., comprising alkyl, straight or branched chain, of from 1 to 10 carbon atoms, e.g., methyl, ethyl, propyl, isopropyl, and the like, and aryl, preferably phenyl. The preferred silicone fluids are dimethyl or dimethyl-diphenyl copolymers.

The polystyrene resin of (v) is a low molecular weight polystyrene having an average molecular weight of from about 30,000 to about 60,000, preferably from about 45,000 to about 55,000. An example is KPTL-5, commercially available from Arco Polymers.

The alkyl esters of adipic acid and glycolic acid of (v) are preferably those which contain alkyl of from 1 to 6 carbon atoms, e.g., methyl, ethyl, propyl, isopropyl, n-butyl, isobutyl, and the like.

The dialkyl phthalate of (v) are preferably those of the formula:

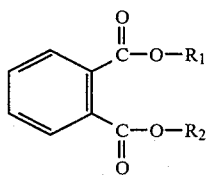

wherein $R_1$ and $R_2$ are independently selected from the group consisting of alkyl, such as straight or branched chains of from 1 to 30 carbon atoms, e.g., methyl, ethyl, propyl, n-butyl, n-hexyl, decyl, tridecyl, and the like.

The triaryl phosphates are selected from compounds of the formula:

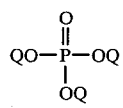

wherein each Q is the same or different and is aryl, e.g., phenyl, naphthyl, and the like. Each Q can be either unsubstituted or substituted, such as alkyl substituted phenyl, alkyl substituted naphthyl, hydroxyphenyl, hydroxynaphthyl, hydroxyalkaryl, and the like. Examples are tricresyl phosphate, triisopropylphenyl phosphate, triphenyl phosphate and the like.

The amounts of individual components in the composition can vary. In preferred embodiments, the compositions will comprise from about 1 to about 70, preferably from about 10 to about 60 parts by weight of polyphenylene ether resin (i), from about 99 to about 30, preferably from about 90 to about 40 parts by weight of styrene resin (ii), from about 1.5 to about 15 parts by weight of halogenated aromatic flame retardant compound (iii), from about 1 to about 5 parts by weight of an antimony containing compound (iv), and from about 1 to about 15 parts by weight of additive (v).

The compositions of this invention can be prepared by forming a blend premix of the ingredients, passing the premix through an extruder at an elevated temperature, e.g., 400° to 650° F., dependent on the requirements of the particular composition, cooling and chopping the extrudate into pellets and molding the pellets to the desired shape.

DESCRIPTION OF THE PREFERRED EMBODIMENTS

The following examples illustrate the compositions of this invention. They are set forth merely by way of illustration and are not to be construed as limiting.

EXAMPLES 1-6

Blends of 35 parts by weight of granular poly(2,6-dimethyl-1,4-phenylene) oxide (PPO, General Electric Co.), 65 parts by weight of rubber-modified high-impact polystyrene (FG 834, Foster-Grant Co., containing about 9% by weight of polybutadiene rubber), 8 parts by weight of decabromodiphenyl oxide, and 3 parts by weight of antimony oxide, and 5 parts by weight of additive (see Table 1) are prepared. The blends are passed through a screw extruder at a temperature between 450° F. (set) and 475°-500° F. (melt). After extrusion, the samples are pelletized and the granules are injection molded into test bars in a Newbury machine at a temperature of about 450° F. and a mold temperature of about 170° F.

The test bars are evaluated according to ASTM and Underwriters' Laboratories' procedures to determine flame retardancy and other physical properties. The results are shown in Table 1.

TABLE 1

| Sample No. | Additive | Tensile Yield (psi) | Tensile Elongation (%) | Izod Imp. (ft.lbs./in.n.) | Gardner Imp. (in.-lbs.) | Heat Deflection Temp. (°F.) | UL-94 Flame Test (Sec.1st/sec.2nd) |
|---|---|---|---|---|---|---|---|
| 1* | None | 8700 | 36 | 2.0 | 49 | 225 | 2/2,4/2,2/5,1/6 |
| 2 | Polyester (Santicizer 411) | 7700 | 45 | 3.6 | 121 | 215 | 2/3,4/5,2/2,2/1 |
| 3 | Polyester (Valox 310) | 8600 | 50 | 2.7 | 60 | 230 | 3/5,6/14,1/3,3/3 |
| 4 | Polyethylene (M-710) | 7600 | 20 | 2.4 | <10 | 233 | 2/7,2/3,3/3,1/3 |
| 5 | Methyl-phenyl silicone fluid (SF-1154) | 7700 | 46 | 2.1 | 50 | 213 | 1/4,1/3,2/3,2/3 |
| 6 | Low molecular weight (polystyrene (KPTL-5) | 8200 | 40 | 2.1 | 62 | 225 | 2/2,3/4,2/6,2/3 |

*control sample

All of the above compositions according to this invention are self-extinguishing and do not drip during burning. All of the compositions have heat deflection temperatures greater than 213° F. Improvements in tensile elongation, Izod impact strength and Gardner impact strength are also obtained.

EXAMPLES 7-16

The following examples further illustrate compositions according to this invention.

Using the procedure described in Examples 1-6, compositions are prepared using the same polyphenylene ether resin, styrene resin, halogenated aromatic flame retardant compound, and antimony compound, as in Examples 1-6, with the additives shown in Table 2. Test bars of these compositions are evaluated according to ASTM procedures, and the results are shown in Table 2.

TABLE 2

| Sample No. | Additive | Izod Imp. (ft.lbs./in.n.) | Gardner Imp. (in.-lbs.) |
|---|---|---|---|
| 7* | None | 2.1 | 82 |
| 8 | Polyester (Paraplex G 25) | 4.4 | <10 |
| 9 | Polyester (Paraplex G 30) | 2.8 | 123 |
| 10 | Polyester (Paraplex G 41) | 4.8 | 81 |
| 11 | Epoxy (Monoplex S 38) | 2.5 | 131 |
| 12 | Epoxy (Monoplex S 75) | 3.4 | 193 |
| 13 | Polyester (Plastolein 9965) | 4.0 | 181 |
| 14 | Polyester (Plastolein 9789) | 5.5 | 50 |
| 15 | Trimellitate ester (Santicizer 79TM) | 2.4 | 123 |
| 16 | Polyester (Santicizer 409) | 3.8 | 151 |

*control sample

Other modifications and variations of the compositions of this invention are possible in the light of the above teachings. For instance, extending fillers, stabilizers, reinforcing fillers, pigments and other materials may be used for their conventional functional purposes. It is to be understood therefore that modifications of the invention described above can be made which are within the full intended scope of the invention as defined in the appended claims.

I claim:

1. A self-extinguishing, non-dripping thermoplastic molding composition which comprises:
   (i) a polyphenylene ether resin;
   (ii) a styrene resin;
   (iii) a halogenated aromatic flame retardant compound;
   (iv) an antimony containing compound; and
   (v) an additive selected from the group consisting of alkyl esters of trimellitic acid, epoxy stearates, epoxy tetrahydrophthalates, diorganopolysiloxane fluids, alkyl esters of adipic acid, alkyl esters of glycolic acid and dialkyl phthalates.

2. A composition as defined in claim 1 wherein the polyphenylene ether resin (i) is of the formula:

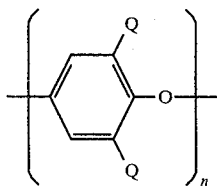

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus; and wherein the styrene resin (ii) has at least 25% by weight of the repeating units derived from a vinyl aromatic compound of the formula:

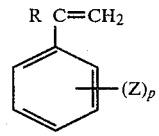

wherein R is hydrogen (lower) alkyl or halogen; Z is vinyl, halogen or (lower) alkyl; and p is 0 or an integer from 1 to the number of replaceable hydrogen atoms on the benzene nucleus.

3. A composition as defined in claim 2 wherein in said polyphenylene ether, Q is methyl and in said styrene resin, R is hydrogen and p is 0.

4. A composition as defined in claim 3 wherein said styrene resin is a rubber-modified high-impact polystyrene.

5. A composition as defined in claim 1 wherein the halogenated aromatic flame retardant (iii) is selected from the group consisting of chlorinated benzene, brominated benzene, chlorinated biphenyl, brominated biphenyl, chlorinated terphenyl, brominated terphenyl, a compound comprising two phenyl radicals separated by a divalent alkylene or oxygen group and having at least two chlorine or bromine atoms per phenyl radical, monochloropolystyrene, bromine containing aromatic polycarbonates, chlorine containing aromatic polycarbonates and mixtures thereof.

6. A composition as defined in claim 5 wherein said halogenated aromatic flame retardant is decabromodiphenyl oxide.

7. A composition as defined in claim 1 wherein said additive (v) is an alkyl ester of trimellitic acid.

8. A composition as defined in claim 1 wherein said additive (v) is an epoxy stearate.

9. A composition as defined in claim 1 wherein said additive (v) is an epoxy tetrahydrophthalate.

10. A composition as defined in claim 1 wherein said additive (v) is an alkyl ester of adipic acid.

11. A composition as defined in claim 1 wherein said additive (v) is an alkyl ester of glycolic acid.

12. A composition as defined in claim 1 wherein said additive (v) is dialkyl phthalate.

13. A composition as defined in claim 1 wherein said additive (v) is a diorganopolysiloxane fluid.

14. A composition as defined in claim 13 wherein said polysiloxane is a dimethyl polysiloxane fluid.

15. A composition as defined in claim 13 wherein said polysiloxane fluid is a dimethyl-diphenyl copolymer.

16. A composition as defined in claim 1 which comprises from about 1 to about 70 parts by weight of polyphenylene ether resin (i), from about 99 to about 30 parts by weight of styrene resin (ii), from about 1.5 to about 15 parts by weight of halogenated aromatic flame retardant compound (iii), from about 1 to about 5 parts by weight of an antimony containing compound (iv), and from about 1 to about 15 parts by weight of additive (v).

17. A thermoplastic molding composition which comprises:
(i) from about 1 to about 70 parts by weight of poly(2,6-dimethyl-1,4-phenylene) ether;
(ii) from about 99 to about 30 parts by weight of rubber-modified high-impact polystyrene;
(iii) from about 1.5 to about 15 parts by weight of decarbromodiphenyl oxide;
(iv) from about 1 to about 5 parts by weight of antimony oxide; and
(v) from about 1 to about 15 parts by weight of a substituent selected from the group consisting of alkyl esters of trimellitic acid, epoxy stearates, epoxy tetrahydrophthalates, diorganopolysiloxane fluids, alkyl esters of adipic acid, alkyl esters of glycolic acid and dialkyl phthalates.

* * * * *